United States Patent [19]
Treadwell, III et al.

[11] Patent Number: 5,845,280
[45] Date of Patent: Dec. 1, 1998

[54] METHOD AND APPARATUS FOR TRANSMITTING A FILE IN A NETWORK USING A SINGLE TRANSMIT REQUEST FROM A USER-MODE PROCESS TO A KERNEL-MODE PROCESS

[75] Inventors: David R. Treadwell, III, Woodinville; Michael T. Massa, Seattle, both of Wash.

[73] Assignee: Microsoft Corporation, Redmond, Wash.

[21] Appl. No.: 533,537

[22] Filed: Sep. 25, 1995

[51] Int. Cl.$^6$ ........................................ G06F 17/00
[52] U.S. Cl. .................... 707/8; 707/9; 395/673; 395/677
[58] Field of Search .................. 395/601, 610, 395/200.03, 200.09, 406, 670–678, 680–686; 707/1–206

[56] References Cited

U.S. PATENT DOCUMENTS

| | | | |
|---|---|---|---|
| 5,109,515 | 4/1992 | Laggis et al. | 395/610 |
| 5,394,526 | 2/1995 | Crouse et al. | 395/200.01 |
| 5,408,617 | 4/1995 | Yoshida | 395/680 |
| 5,515,508 | 5/1996 | Pettus et al. | 395/200.01 |
| 5,537,417 | 7/1996 | Sharma et al. | 395/200.02 |

OTHER PUBLICATIONS

Tanenbaum, A, "Operating Systems", 1987, pp. 36–43.

*Primary Examiner*—Wayne Amsbury
*Assistant Examiner*—David Yiuk Jung
*Attorney, Agent, or Firm*—Leydig, Voit & Mayer, Ltd.

[57] ABSTRACT

A method and apparatus for transmitting files on a network are described. In response to a network request for a file stored on a secondary data storage device such as a hard disk, a file server retrieves and transmits the file using a reduced number of calls from user-mode processes to kernel-mode processes.

In response to a file request from a non-local networked machine, a user-mode process on the file server issues a command to a kernel-mode process requesting transmission of the requested file to the non-local networked machine via a designated connection. In response, the requested file is retrieved from the secondary data storage device and placed in kernel-mode accessed memory (e.g., cache memory). After the requested file information is stored in the kernel-mode accessed memory, a kernel-mode data transmission procedure transmits the requested file information directly from the kernel-mode accessed memory.

78 Claims, 4 Drawing Sheets

| File Identification | 60 |
| Connection Identification | 62 |
| Length of File | 64 |
| Bytes Per Send | 66 |
| Overlapped | 68 |
| File Head Buffer Pointer | 70 |
| File Tail Buffer Pointer | 72 |

Transmit File Request

MDL Chain

| Data Pointer | 114 |
| Data Length | 116 |
| Pointer to Next (Chained) MDL | 118 |
| Status and Control Fields | 120 |

Memory Descriptor List (MDL)

METHOD AND APPARATUS FOR TRANSMITTING A FILE IN A NETWORK USING A SINGLE TRANSMIT REQUEST FROM A USER-MODE PROCESS TO A KERNEL-MODE PROCESS

AREA OF THE INVENTION

The present invention relates generally to the area of networked file servers, and more particularly to methods for file servers operating at a relatively high, user-mode (e.g., ring 3), level in an operating system, to perform a transport protocol independent, file transmission in response to a request from a networked client.

BACKGROUND OF THE INVENTION

A fundamental operation executed by file servers is transmission of a file from a first storage location to a specified destination or set of destinations. In a known method for transmitting a file in response to a client request, a process operating in user-mode (e.g., ring 3) submits a file retrieve command to a kernel-mode (e.g., ring 0) file server process. After receiving the file retrieve command, the kernel-mode file server process copies the file identified in the file retrieve command to a buffer in non-cache user addressable RAM. Thereafter, the kernel-mode file server process informs the user-mode process of the completed file copy to the buffer. The user-mode process makes a separate system call to a transport protocol invoking a data transmit procedure for transmitting the buffered file to an identified destination. The buffered file is then transmitted via the transport protocol.

Another method for transmitting a file utilizes memory mapping techniques rather than actually copying a file to a transmission buffer. A user-mode server process submits system calls to kernel-mode processes to send the data without buffering in user-mode accessed memory the file that is to be transmitted. This method however, presents several drawbacks. First, large files must be handled by a sequence of separate requests by the user-mode process to the file server process wherein each request corresponds to a portion of the entire file. Second, separate user-mode calls to the transport protocol are needed in the event that an application wishes to send additional information along with the transmitted file data. Third, memory mapping operations require a significant number of CPU cycles. Therefore, the overall performance of the file server may degrade in the event that the memory mapping facilities are called upon frequently to perform file transmissions.

Furthermore, in order for user-mode (e.g., ring 3) processes to invoke operations at the lowest, and most privileged, level of the operating system (e.g., ring 0), it is typically necessary for the operating system to execute a number of preliminary operations. The preliminary operations consume considerable CPU cycles.

SUMMARY OF THE INVENTION

It is a general object of the present invention to reduce the system overhead encountered when a file is transmitted from a memory location associated with a secondary data storage device to a remote machine on a network.

It is a more specific object of the present invention to reduce the number of system calls associated with sending file data associated with a local secondary data storage device to a remote machine on a network.

It is yet another object of the present invention to reduce intermediate buffering of transmitted files.

Another specific object of the present invention is to enable a user-mode process to request transmission of additional information along with the file data without incurring the overhead associated with additional system calls to kernel-mode processes.

Another more particular object of the present invention is to reduce the number of packet transmissions needed to transmit a message including both data and associated sender information.

The above and other objects are met in a new method and apparatus for transmitting file data on a network. The present invention is incorporated into a network including a file server associated with a secondary data storage device such as a hard disk or CD ROM drive, and wherein other machines on the network request the file server to retrieve and transmit file data stored on the secondary data storage device. A file server embodying the present invention sends file data stored on a local secondary data storage device to a remote machine with reduced system overhead and consequently less usage of the local CPU to perform overhead functions associated with a file data transmission. As a result, system performance is improved over known data transmission methods.

In response to a file data request from another networked machine, a user-mode process on the file server issues a system call including a non-address file identification (e.g., a file handle) to a kernel-mode process requesting transmission of the identified file to a machine on the network. The use of a non-address file identification avoids the overhead encountered by known memory-mapped file data transmit procedures. In response to the system call, data from the identified file is retrieved from the secondary data storage device and placed in a buffer in kernel-mode accessed memory (e.g., cache memory).

After the requested file information is stored in the buffer in the kernel-mode accessed memory, a kernel-mode data transmission procedure transmits the requested file information directly from the buffer in the kernel-mode accessed memory. The reading of the data directly from the kernel-mode accessed memory during file transmission provides enhanced performance over known file data transmission methods that rely upon copying the data from user-mode data buffers to kernel-mode accessed data buffers during file transmissions.

In accordance with an embodiment of the invention, when a file data request exceeds the maximum data block size that can be processed in a single send request to a transport layer data transmission procedure, then a kernel-mode procedure separates the requested file data into a plurality of data blocks that are processed individually by the transport layer data transmission procedure. Thus, large data transmission can be accomplished by a single system call from a user-mode process. This aspect of an embodiment of the present invention avoids the overhead encountered by the known memory-mapped file transmit procedure that requires a separate system call from a user-mode process for each transmitted data block.

In addition to the above described improvements over the known file transmit procedures, the file server enables the user-mode process to specify head and tail (caller data) portions in the single system call to a kernel-mode process to transmit file data. The head and tail portions of the transmitted data include information relating to the transmitted file data such as, for example, file identification information and control information marking the end of the transmitted file data. Thus, system overhead associated with system calls from user-mode processes to kernel-mode processes involved in the transmission of the additional designated caller data by means of separate data transmissions is avoided.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE DRAWINGS

Figure 1:
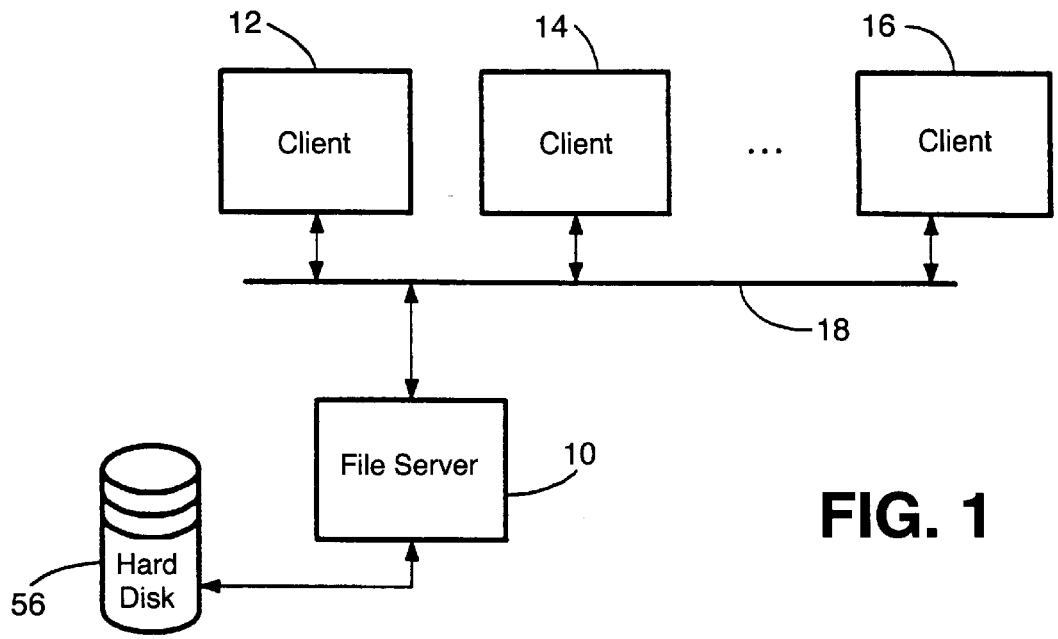
FIG. 1 is a schematic drawing of an illustrative local area network suitable for incorporating the present invention, and including a file server and a number of client machines.

Turning now to FIG. 1, an illustrative local area computer network is depicted. The network includes a File Server 10 which services requests from Client Machines 12, 14 and 16 for file data stored on a secondary data storage device such as for example a Hard Disk 56. In other embodiments of the invention, the secondary data storage device may be, for example, a magnetic drum, CD ROM drive, or magnetic tape drive. The Client Machines are communicatively linked to the File Server 10 via a network link 18 comprising, for example, coaxial cable in an Ethernet system, or optic fiber in a token ring system.

While an illustrative local area network suitable for carrying out the present invention is illustrated in FIG. 1, it will be appreciated by those skilled in the art that the present invention may be incorporated into a number of diverse network topologies—both local and wide area. Suitable WAN systems including modems and RF transmitters/receivers to facilitate communication between the File Server 10 and a requesting client machine will be known to those skilled in the art. The present invention is ideally suited for environments where the performance of a file server is important. Examples of such servers are news servers, bulletin board servers, and Internet servers. Other desirable networks suitable for incorporating the present invention, including hybrid LAN/WAN networks, will be known to those skilled in the art.

Figure 2:
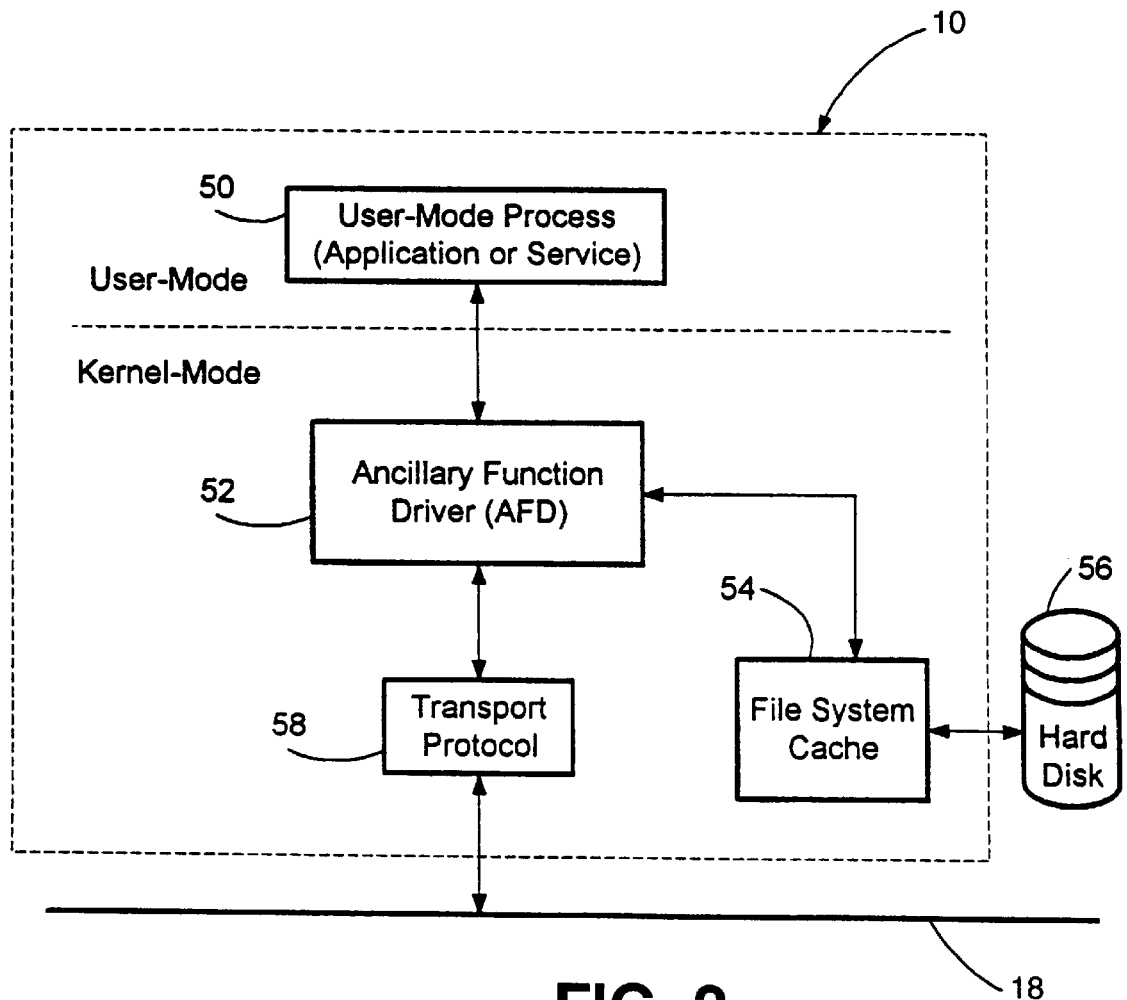
FIG. 2 is a schematic functional diagram of a file server wherein file data is transmitted directly from a cache memory without buffering the file data in user-mode accessed memory.

Turning now to FIG. 2, the functional components of the File Server 10 embodying the present invention are schematically illustrated. File data transmission commands are issued from a user-mode process in order to initiate a kernel-mode file transfer. The user-mode process 50 corresponds, for example, to an application program or a high level service that responds to requests from multiple users and/or multiple machines. The user-mode process 50 operates at a relatively high level in the operating system of the File Server 10. In the well known ring approach to modelling an operating system, the user-mode process 50 operates at a relatively outer ring such as ring 3.

User-mode processes are relatively insecure and are assigned relatively low priority in the operating system. On the other hand, kernel-mode processes operate in a relatively secure environment and are allocated a relatively high priority in a multi-processing environment. Furthermore, the use of file handles in accordance with the preferred embodiment of the present invention provides advantages over direct addressing in regard to the security provided by the system since a proper file handle must be submitted to the system in order to perform an operation involving the file. Other protective measures implemented in accordance with a preferred embodiment of the invention include: (1) validation of the head and tail buffer pointers—which comprises making sure that they point to valid memory and that their length fields are proper—in order to prevent system crashes due to an improper buffer size, location or format, and (2) verification that the submitted file handle was opened by the user-mode process with read access requested.

In accordance with the present invention, the user-mode process 50 makes a single system call (described below) to an ancillary function driver (AFD) 52, operating in kernel-mode, in order to execute a file transmission including a file data portion as well as optional head and tail information. By minimizing system calls between the user-mode process and the kernel-mode processes, delay and operating system overhead are minimized during the file transmission.

The AFD 52 is a kernel-mode administrator that coordinates carrying out a file data (and optional caller data) transfer after receiving a file transmit system call from the user-mode process 50. In response to receiving the file transmit system call, the AFD 52: (1) requests caching, by a File System Cache 54, of a file (or file portion) stored on the hard disk 56 and designated (by a non-address file identification) in the file transmit system call, and (2) calls a transport protocol 58 to initiate transmission via the network link 18 of the cached file as well as any additional head and tail information designated in the file transmit system call by the user-mode process 50. It will be appreciated by those skilled in the art that the Transport Protocol 58 includes not only the OSI Model transport layer protocol, but also includes procedures and hardware for carrying out the lower level Network, Data link, and Physical layers. In some cases, the transport layer also includes the presentation and session layers.

The File System Cache 54 is a well known memory mechanism that reads data from the hard disk 56 and temporarily stores the data in kernel-mode accessed (system) memory (not shown). The File System Cache 54 provides a significant performance advantage over non-cached systems when the cached data is read a plurality of times after being copied from the hard disk 56.

The Transport Protocol 58 is responsible for sending the designated file data, and optional head and tail information, to a destination machine. The Transport Protocol 58 ensures that the data is transmitted to the connected destination and arrives at the destination in correct order (in the case of multiple packets) and without errors. It is noted that the Transport Protocol 58 may enforce limits upon the maximum size data block that can be transmitted in response to a single "send" request submitted by the AFD 52. Therefore, when a large file is to be transmitted, the AFD 52 divides the data to be transmitted into a series of blocks of data submitted by the AFD 52 to the Transport Protocol 58 in separate send requests. The present invention does not rely upon any particular transport protocol, and thus a wide variety of suitable transport protocols for use in combination with the systems embodying the present invention will be known to those skilled in the art of electronic communication networks. However, two particular transport protocols utilized in particular embodiments of the present invention are the known TCP/IP and IPX/SPX transport protocols.

Figures 3, 5, 6:
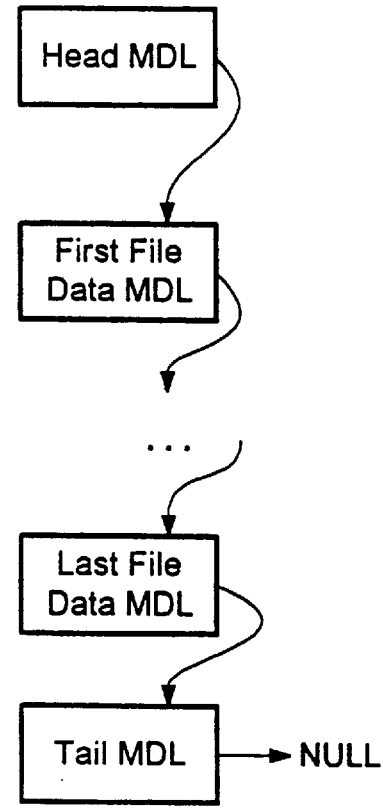
FIG. 3 is a schematic drawing of the fields within a transmit file request from a user-mode process to a kernel-mode ancillary function driver.
FIG. 5 is a schematic drawing of the fields within a memory descriptor list submitted by the cache memory to the ancillary function driver.
FIG. 6 is a schematic drawing of an MDL chain comprising a Head, a Data and a Tail MDL.

Turning to FIG. 3, a system call from the user-mode process 50 to the AFD 52 comprises a number of argument fields including a File Identification 60 including a non-address file identification. The use of a non-address file identification, submitted in the File Identification 60, to identify file data is distinguished from the use of a pointer (address) submitted by a user-mode process in the known memory-mapped data transmission procedure.

In the preferred embodiment of the invention, the File Identification 60 is an open file handle. The open file handle is a system level identification which is used by kernel-mode processes to locate a corresponding file. In an alternative embodiment the system call may instead include a file name instead of the preferred file handle.

Furthermore, since the data within a file is read sequentially during file transmission, the file is preferably opened with a special control instruction designating sequential scanning of the opened file in order to provide better caching performance. Performance gains are thus achieved as result of the File System Cache 54 performing more aggressive read-ahead caching.

The system call to the AFD 52 also comprises a Connection Identification 62. In the preferred embodiment of the invention, the Connection Identification 62 is a connected socket handle. The connected socket handle is a system level identification used by kernel-mode transport layer protocol processes to transmit the identified file to a connected destination associated with the connected socket handle. The connected socket handle is preferably either a datagram socket or a virtual circuit socket corresponding to two well known data transmission methods.

Next, a Length of File field 64 specifies the total number of bytes to be sent from the file specified in the File Identification 60 during the file transmit operation. In the preferred embodiment of the invention, a length of file equal to zero indicates that the entire file is to be transmitted.

The system call also includes a Bytes Per Send field 66. The Bytes Per Send field 66 specifies a maximum size of a block of data from the file specified by the File Identification 60 that is transmitted by the transport protocol 58 in response to each call by the AFD 52 to transmit file data. In the event that the size of a file exceeds the value in the Bytes Per Send field 66, the file is transmitted in parts. Each part is handled in a separate send operation submitted by the AFD 52 to the transport protocol 58. A value of zero in the Bytes Per Send field 66 indicates that a default value is to be used. The default value is obtained by reference to the particular protocol used to send the data. This is primarily used in datagram transmission protocols wherein size limitations are typically imposed in order to ensure desired network performance.

In the preferred embodiment of the present invention, the File Server 10 is capable of performing asynchronous file transmissions in a manner referred to as "Overlapped I/O".

In accordance with an Overlapped I/O procedure, a user-mode process makes a system call requesting a file transfer to the AFD 52. The request includes a reference to an "event object." The event object indicates the current status of an asynchronous request. In a preferred embodiment of the present invention, the event object is referenced by means of a handle in order to determine or modify the status of an asynchronous request.

After receiving the system call from the user-mode process, the AFD 52 initiates a file transfer by submitting a request to the transport protocol 58. The transport protocol 58 initially returns an "I/O pending" message to the AFD 52. The AFD 52 may then pass the I/O pending message to the user-mode process in order to allow the user-mode process to continue processing while the file transmission completes. In addition, the AFD 52 resets the event object to indicate, to the user-mode process, the "pending" status of the request. When the transmission is complete, the transport protocol 58 issues a second message to the AFD 52 indicating that the file transfer operation is completed. In response, the AFD 52 sets the event object in order to indicate to the user-mode process that the file transmission is complete.

In the preferred embodiment of the invention, the system call further includes an Overlapped field 68. The Overlapped field 68 includes two sub-fields. First, the Overlapped field 68 includes an offset sub-field which stores a location within a specified file at which data transmission is to begin. Second, the overlapped field includes an event handle sub-field for facilitating the above-described overlapped I/O procedure. When a socket handle associated with the file transfer is opened as "overlapped", an "event" handle is stored in the event handle sub-field corresponding to an event object. The event object is used to synchronize operations between the user-mode process and the AFD 52 during the execution of the file transmission. As previously explained, after successfully initiating the file transmission, the AFD 52 resets the event object corresponding to the event handle passed in the Overlapped field 68 and passes an "I/O pending" message directly to the user-mode process. After the file transmission is completed, the AFD 52 sets the event object corresponding to the event handle in the Overlapped field 68 to indicate to the user-mode process that the file transmission is complete.

In the preferred embodiment of the invention, sockets are opened by default as "overlapped." However, if a socket handle is opened "not overlapped", then the event handle sub-field is always NULL, and the file transmission procedure starts at offset "0" in the designated file.

The system call also includes a File Head Buffer Pointer 70 and a File Tail Buffer Pointer 72. The File Head Buffer Pointer 70 and the File Tail Buffer Pointer 72 each include (1) a pointer to memory allocated to user-mode processes in main memory where a block of information is stored and (2) a length field identifying the length of the designated block of information in main memory corresponding to the head or tail data associated with the File Head Buffer Pointer 70 and File Tail Buffer Pointer 72. The blocks of data designated by the File Head Buffer Pointer 70 and the File Tail Buffer Pointer 72 are sent before and after the file specified in the File Identification 60 respectively. A NULL value in the pointer field for either the File Head Buffer Pointer 70 or the File Tail Buffer Pointer 72 indicates that a file head or tail will not be transmitted in association with the specified file.

Figure 4:
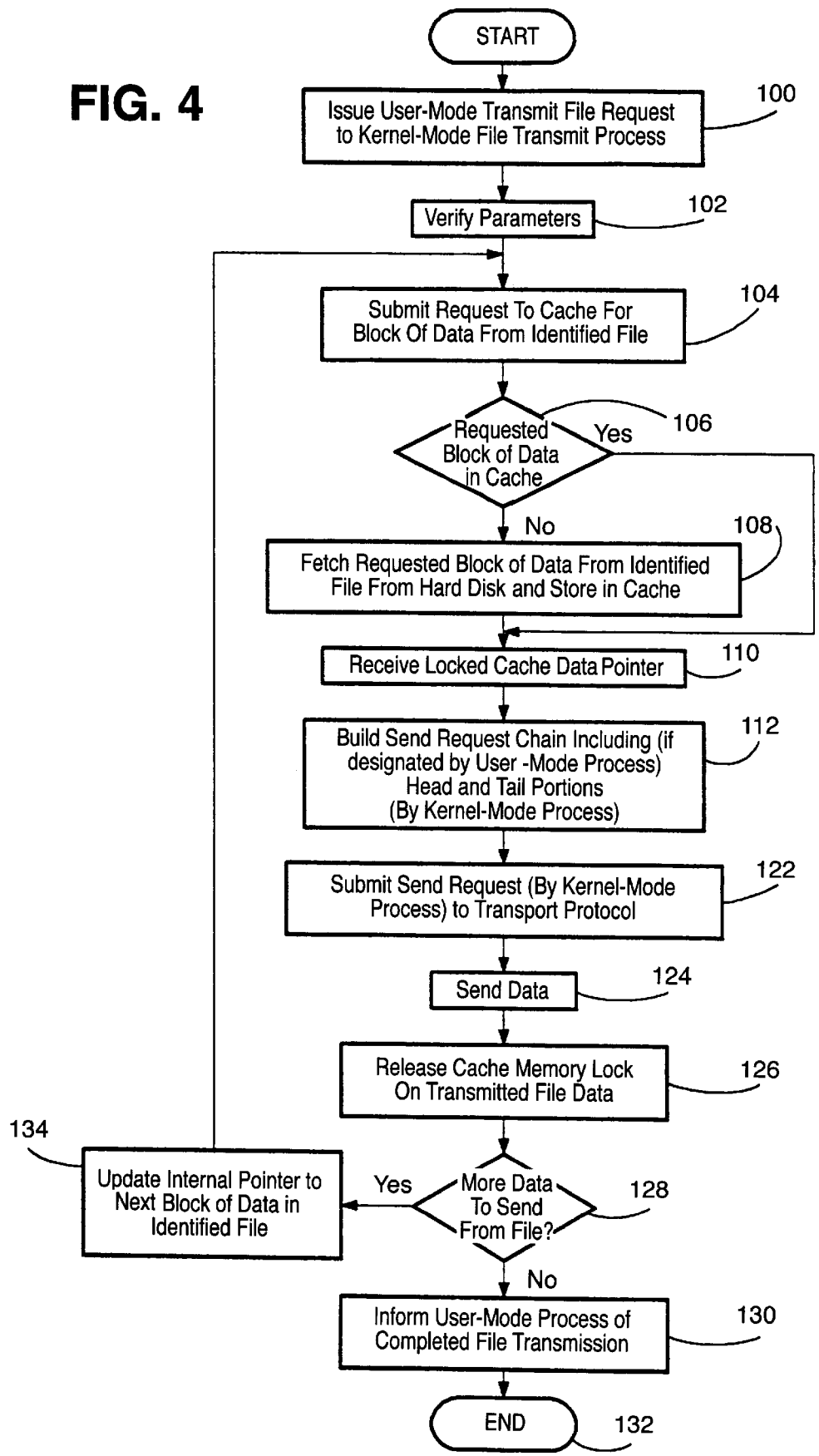
FIG. 4 is a flowchart summarizing the steps performed by the file server to transmit a file in accordance with a preferred embodiment of the present invention.

Turning now to FIG. 4, the steps are summarized for transmitting a segment of data from an identified file stored on the hard disk 56 in accordance with a preferred embodiment of the present invention. In the preferred embodiment of the invention, the "segment of data" may comprise, for example, an entire file, or alternatively, a portion of a file (starting at a point in the file designated by means of a value stored in the offset sub-field of the Overlapped field 68 in the transmit request from a user-mode process).

At step 100, the user-mode process 50, having previously established a network connection (specified by the Connection Identification 62) to a remote machine and opened a file (specified by the File Identification 60), initiates a transmit operation on a segment of data by issuing a transmit file request of the type depicted in FIG. 3 to the AFD 52 kernel-mode process. As will be appreciated by those skilled in the art, the request is provided in the form of a system call including arguments corresponding to the fields summarized in FIG. 3.

After the AFD 52 receives the transmit file request, at step 102, the AFD 52, operating in kernel-mode, verifies that the transmit file request specifies a valid file handle and connection handle. In addition, the AFD 52 verifies that the head and tail buffers (if specified) are valid. The AFD 52 also confirms that the identified file contains the requested byte range in the case where a portion of a file is to be transmitted. Finally, the AFD 52 determines whether the overlapped field 68 is valid for purposes of performing the file transmission.

Next, at step 104 the AFD 52 submits a file request to the File System Cache 54 identifying a block of data stored on the hard disk 56 corresponding to the file specified in the File Identification 60. Those skilled in the art and familiar with the operation of cache memory systems will appreciate the need to limit the portion of a cache memory that will be allocated to a single file request in order to ensure the availability of cache memory space for other file requests.

The number of bytes allocated by the File System Cache 54 to a single file request increases along with increases in the size of the physical memory in the File Server 10. If the physical memory size is less than 13 Mbytes, then a single file request is allocated a maximum of 4 Kbytes. If the physical memory size is between 13 MBytes and 19 MBytes, then a single file request is allocated a maximum of 8 Kbytes. Finally, if the physical memory is greater than 19 MBytes, then each file request is allocated a maximum of 64 KBytes.

If the file identified in the File Identification 60 is sufficiently small (in view of the maximum cache memory available for a single request), then the AFD 52 submits a request to the File System Cache 54 to store the entire identified file in kernel-mode accessed memory allocated to the File System Cache 54 (hereinafter referred to as cache memory). However, if the file is larger than the maximum data block permitted by the File System Cache 54 for a single requesting process, then the AFD 52 specifies the file, an offset in the file at which data retrieval will begin, and a number of bytes that the AFD 52 requests to be stored in the cache memory by the File System Cache 54.

In response to receiving a request for a block of data from the AFD 52, the File System Cache 54 determines in a known manner whether the requested block of data is presently stored in the cache memory. At step 106, if the requested block of data is not currently within the cache memory, then control passes to step 108 wherein the File System Cache 54 retrieves the requested block of data from the hard disk 56 (or other secondary storage) and stores the requested block of data in the cache memory in a known manner. Control then passes to step 110. However, if the requested block of data is currently stored in the cache memory, then control passes directly from step 106 to step 110.

At step 110, the AFD 52 receives a Cache Data Pointer returned by the File System Cache 54 in response to the request for a block of data issued by the AFD 52 during step 104. The Cache Data Pointer comprises an address corresponding to the beginning of a Memory Descriptor List (MDL) chain comprising one or more MDLs (described in greater detail below in conjunction with FIG. 5). The MDL chain comprises one or more pointers to locked cache memory where the requested file data is presently stored.

Next, at step 112, the AFD 52 builds a Send Request for the Transport Protocol 58. The Send Request comprises at least one MDL comprising the pointer to the file data in cache memory received by the AFD 52 during step 110. If the requested file data is currently stored in the cache memory served by the File System Cache 54, then a buffer in the cache memory containing the requested file data is referenced by a set of chained MDLs in the Send Request. In addition, the Send Request to the Transport Protocol 58 includes, optionally (under the direction of the user-mode process 50), (1) a Head MDL identifying information which is transmitted before the file data and (2) a Tail MDL identifying information which is transmitted after the file data. In the preferred embodiment of the present invention, instead of pointing to cached data, the Head MDL and Tail MDL comprise pointers to locations in memory addressable by user-mode processes. In alternative embodiments of the invention, the Head and Tail information may be stored in memory only addressable by kernel-mode processes.

Turning briefly to FIG. 5, the MDL includes a Data Pointer 114. The Data Pointer 114 provides an address corresponding to the starting point in memory where a block of data is stored. A Data Length field 116 specifies the number of bytes of data stored in the memory starting at the address specified by the Data Pointer 114.

As explained above, a Send Request may comprise a plurality of chained MDLs referencing a buffer in the cache memory containing a portion of the file to be transmitted by the File Server 10. Each MDL includes a Pointer to Next MDL 118. The Pointer to Next MDL 118 specifies the location in kernel-mode accessed (system) memory where a succeeding chained MDL (corresponding to either a File Data MDL or the Tail MDL) is stored. The Pointer to Next MDL 118 is NULL in the Tail MDL since the Tail information is the final block of information transmitted under the File Transmit procedure embodying the present invention. If the Send Request does not include a Tail MDL, then the Pointer to Next MDL 118 in a last "File Data" MDL in an MDL chain is set to NULL.

Turning briefly to FIG. 6, an illustrative MDL Chain comprising a Head MDL, a string of File Data MDLs and a Tail MDL is depicted. The data referenced by the data pointer 114 for the Head MDL schematically depicted in FIG. 6 comprises, for example, control information identifying the size of the file being transferred in the File Data portion of the transmission. The data referenced by the data pointer 114 of the Head MDL may also include information describing the contents of the file. The data referenced by the data pointer 114 for the Tail MDL may contain an "End of File" message or similar closing information. It is noted that the above description of information referenced by the head and tail MDLs is by no means limited to the above examples. To the contrary, the range of possibilities for the contents of the head and tail buffers referenced by the Head MDL and Tail MDL is very broad.

It is also noted that while the illustrative example of an MDL chain comprises both a Head MDL and a Tail MDL, other Send Requests submitted to the Transport Protocol 58 may comprise MDL chains that do not include the Head MDL and/or the Tail MDL. For example, if a large file is to be transmitted by the File Server 10, then the first MDL chain submitted in a first Send Request to the Transport Protocol 58 preferably comprises a Head MDL and one or more chained File Data MDLs. If the file is sufficiently large, the next Send Request comprises a set of chained File Data MDLs referencing an intermediate portion of the file (and no Head or Tail MDL). Finally, the last Send Request comprises the remaining File Data MDLs followed preferably by a Tail MDL.

It is also noted that while FIG. 6 depicts a plurality of chained File Data MDLS, the portion of the MDL chain consisting of File Data MDLs may consist of a single File Data MDL. On the other hand there is no upper limit on the number of linked File Data MDLs used to identify a plurality of data blocks in the cache memory served by the File System Cache 54 corresponding to a requested file.

Having described the content and function of the Pointer to Next MDL 118 in association with FIG. 6, attention now returns to FIG. 5 wherein each MDL also includes Status and Control Information 120. The Status and Control Information 120 comprises status information relating to the memory represented by the MDL. For example the locked status of data stored in cache memory is specified in the MDL as well as identification of the physical location of information associated with the MDL. Other appropriate control and status information will be known to those skilled in the art.

The above described MDL element is intended to be illustrative in nature. While MDL fields have been described in conjunction with a description of the preferred embodiment of the present invention, it will be appreciated by those skilled in the art that other fields may be substituted for the described MDL fields in alternative embodiments of the present invention. It is further noted that alternative embodiments of the invention may utilize alternative means for identifying, to the Transport Protocol 58, data and other information files to be transmitted in accordance with the file transmission procedure embodying the present invention.

Returning to FIG. 4, at step 122 the AFD 52 submits the Send Request, comprising one or more chained MDLs, to the Transport Protocol 58. The Send Request also identifies the connection to another machine and process that is to receive the transmitted file. Next, at step 124, the Transport Protocol 58, incorporating lower level network, data link and physical layer protocols, carries out the transmission of the file data and optional head and/or tail information to the connected destination machine and process.

During the course of transmitting the file data directly from the kernel-mode accessed (cache) memory, the Transport Protocol 58 reads file data from the cache memory based upon the Data Pointer 114 in each File Data MDL in a Send Request submitted by the AFD 52 during step 122. Such "direct" reading of data from kernel-mode accessed (cache) memory is distinguished from a known file transmission method wherein the data is copied from a user-mode data buffer to a distinct system-mode data buffer which is a substantially slower method for accomplishing file transmission. After transmitting the data referenced by File Data MDLs and optional head and/or tail information in the Send request submitted by the AFD 52 to the Transport Protocol 58, the Transport Protocol 58 indicates to the AFD 52 that the data transmission associated with the Send Request is complete in accordance with the overlapped I/O procedure described above. Control then passes to step 126.

At step 126, the AFD 52 returns the Cache Data Pointer (provided to the AFD 52 originally during step 110) to the File System Cache 54. The File System Cache 54, in response, releases the lock on the portion of the cache memory associated with the returned Data Pointer. Control then passes to step 128.

At step 128, if all of the data associated with the Usermode Transmit File Request (issued during step 100) has been transmitted, then control passes to step 130. At step 130, the AFD 52 signals to the user-mode process 50 the completion of an "event" (the file transmission) in accordance with the above described overlapped I/O procedure. The "event" signal thus notifies the user-mode process 50 that the file transmission is complete and control passes to End step 132.

However, at step 128, if the file was too large to handle in a single transmission, then control passes to step 134. At step 134, the AFD 52 updates an internal pointer (maintained by the AFD) to a next file segment in the file named in the File Identification 60 of the User-mode Transmit File Request. Control then returns to step 104 wherein the AFD 52 submits a request to the File System Cache 54 for the next file segment.

The ability of the AFD 52 to loop back and perform the sequence of steps beginning with step 104 without a new request from a user-mode process provides advantages over the known file-mapped data transmission procedure when the File Server 10 is called upon to transmit a large file. In particular, when the size of a large file exceeds the maximum size of a block of data that can be transmitted by the transport protocol 58 in response to a single send request, the large file must be broken up into a series of data blocks to be sent by means of a series of corresponding send requests submitted to the transport protocol 58. The known memorymapped file transmission procedure requires the submission of a series of user-mode transmission requests to kernelmode processes in order to generate the series of corresponding send requests for the transport protocol. The overhead associated with each user-mode request to a kernel-mode process is encountered for each one of the series of send requests.

On the other hand, in accordance with the preferred embodiment of the present invention, only a single usermode command is submitted by the user-mode process 50 to the AFD 52 in order to generate the series of send requests submitted to the transport protocol 58 to carry out the transmission of a large file. Thus, the overhead associated with the user-mode process 50 submitting a request to a kernel-mode process is encountered only once when the File Server 10 is called upon to transmit a large file requiring the submission of a plurality of send requests to the transport protocol 58.

Figure 7:
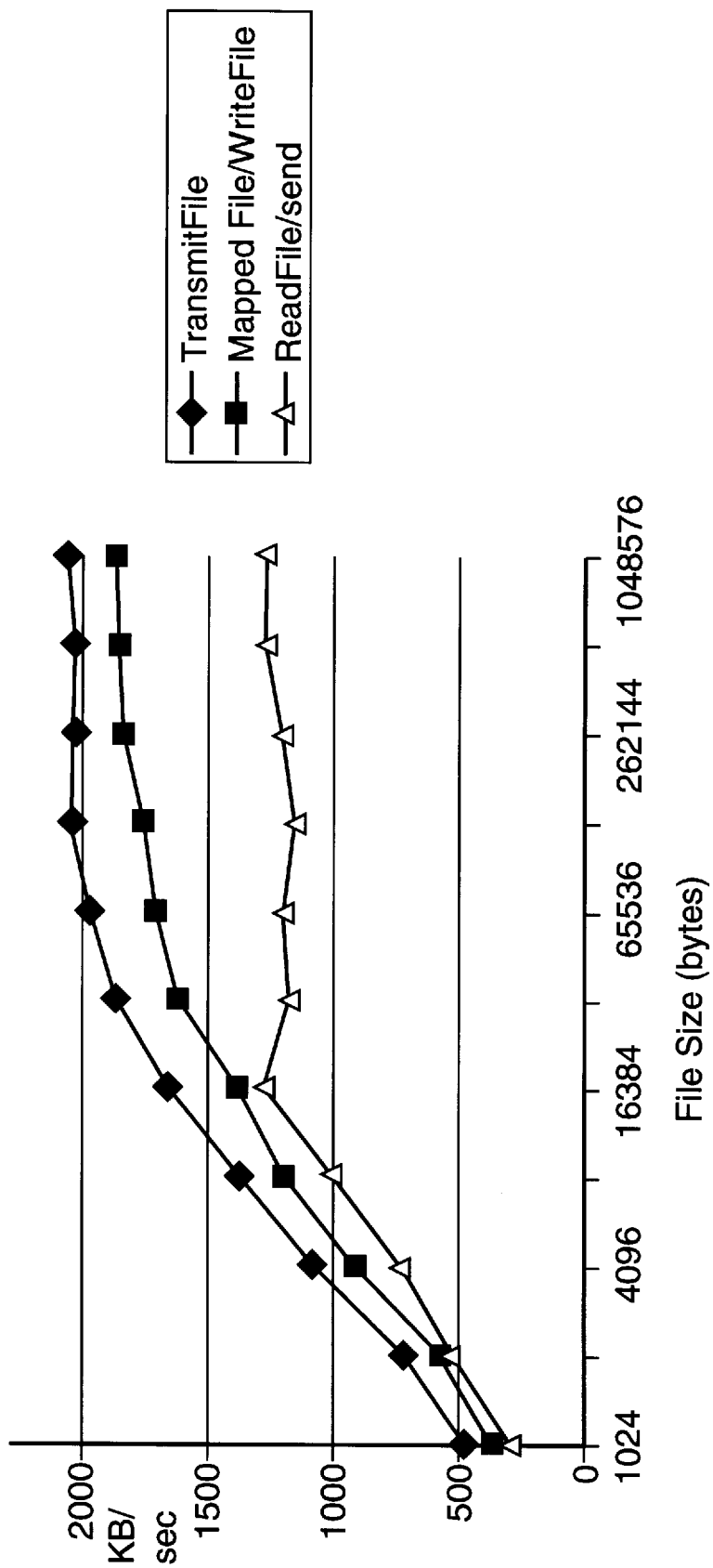
FIG. 7 is a chart showing the improved performance of the method for transmitting files summarized in FIG. 3 over known file transmission methods.

Having described a preferred embodiment of the present invention, a chart is provided in FIG. 7 graphically depicting the performance gain associated with the above described method of transmitting files. The chart provides a comparison of the performance of the new transmit file method to two known file transmission methods for sending files over a network in response to a user-mode process request. The summarized results were obtained using a COMPAQ DESKPRO 486/33L equipped with 16 MB RAM, and two 10 Mbs Ethernets. The results clearly demonstrate that regardless of the file size, the file transmit procedure is superior to both the ReadFile/Send method using user-mode process buffers to hold data retrieved from a hard disk and the Mapped File/WriteFile method—both of which were described previously in the "Background of the Invention" section.

An preferred embodiment as well as alternatives and variations to the preferred embodiment of the present invention have been described. However, as will be evident to those skilled in the art in view of the preferred embodiment described in the drawings and the foregoing written description, the scope of the present invention should not be restricted to the disclosed preferred embodiment. Rather, the invention should be measured by the scope and spirit of the invention as defined by the claims appended below and include such modifications to the disclosed embodiment of the invention that would be known to those skilled in the art.

What is claimed is:

1. A method for transmitting data from a file stored on a secondary data storage device on a first networked machine having a kernel-mode accessed memory to a second networked machine, said method comprising the steps of:

issuing, using a single call by a user-mode process within the first networked machine to a kernel-mode process, a transmit request including a non-address file identification corresponding to the file;

copying by the kernel-mode process, in response to the issuing step, a data block within the file from the secondary data storage device to the kernel-mode accessed memory; and transmitting by a kernel-mode data transmission procedure, in response to the copying step, the data block from the kernel-mode accessed memory to the second networked machine.

2. The method of claim 1 wherein the non-address file identification is a file handle.

3. The method of claim 1 wherein the non-address file identification is a file name.

4. The method of claim 1 wherein the data block is transmitted from the first networked machine to the second networked machine via an established connection between the first networked machine and the second networked machine during the transmitting step, and wherein the method further comprises the step of:

providing, by the user-mode process to a kernel-mode process, a network connection identifier corresponding to the established connection between the first networked machine and the second networked machine.

5. The method of claim 4 wherein the network connection identifier is a socket handle.

6. The method of claim 1 further comprising the step of:

returning, by the kernel-mode process to the user-mode process, an event parameter signalling a successful transmission of data from the file to the second networked machine.

7. The method of claim 1 wherein the data block is stored in a buffer within the kernel-mode accessed memory during the copying step, and the method further comprises the step of:

providing to the kernel-mode data transmission procedure an identifier corresponding to the buffer within the kernel-mode accessed memory.

8. The method of claim 7 wherein the identifier comprises a pointer to the buffer within the kernel-mode accessed memory.

9. The method of claim 1 further comprising:

transmitting caller data, in response to the issuing step, via the kernel-mode data transmission procedure.

10. The method of claim 9 wherein the transmitting caller data comprises the step of sending head data via the kernel-mode data transmission procedure.

11. The method of claim 9 wherein the transmitting caller data comprises the step of sending tail data via the kernel-mode data transmission procedure.

12. The method of claim 1 further comprising the steps of:

transmitting head data, in response to the issuing step, via the kernel-mode data transmission procedure; and transmitting tail data, in response to the issuing step, via the kernel-mode data transmission procedure.

13. The method of claim 1 wherein the kernel-mode data transmission procedure incorporates a transport layer protocol.

14. The method of claim 13 wherein the kernel-mode data transmission procedure incorporates a TCP/IP transport protocol.

15. The method of claim 13 wherein the kernel-mode data transmission procedure incorporates an IPX/SPX transport protocol.

16. The method of claim 1 wherein the kernel-mode accessed memory comprises cache memory administered by a file system cache.

17. The method of claim 1 wherein the secondary data storage device is a hard disk.

18. The method of claim 1 wherein the secondary data storage device is a CD ROM.

19. A method for transmitting, by means of a series of send operations performed by a kernel-mode transmission procedure, data from a file stored on a secondary data storage device on a first networked machine having a kernel-mode accessed memory to a second networked machine, said method comprising the steps of:

issuing, using a single call by a user-mode process within the first networked machine to a kernel-mode process, a transmit request including an identifier of a segment of data;

copying by the kernel-mode process, in response to the issuing step, the segment of data comprising a plurality of data blocks, from the secondary data storage device to the kernel-mode accessed memory; and repeating a plurality of times, by kernel-mode processes, in response to the issuing step, the steps of:

identifying a designated data block of the plurality of data blocks; and transmitting, by the kernel-mode data transmission procedure, the designated data block to the second networked machine.

20. The method of claim 19 further comprising the steps of:

determining, by a kernel-mode process, that a remaining portion of the plurality of data blocks has not been transmitted, and in response thereto updating a pointer identifying a next data block of the segment of data to be transmitted in accordance with said identifying and transmitting steps.

21. The method of claim 19 wherein the designated data block is transmitted from the first networked machine to the second networked machine via an established connection between the first networked machine and the second networked machine during the transmitting step, and wherein the method further comprises the step of:

providing, by the user-mode process to a kernel-mode process, a network connection identifier corresponding to the established connection between the first networked machine and the second networked machine.

22. The method of claim 21 wherein the network connection identifier is a socket handle.

23. The method of claim 19 wherein the designated data block is stored in a buffer within the kernel-mode accessed memory during the copying step, and the method further comprises the step of:
providing to the kernel-mode data transmission procedure an identifier corresponding to the buffer.

24. The method of claim 23 wherein the identifier comprises a pointer to the buffer within the kernel-mode accessed memory.

25. The method of claim 19 further comprising the step of:
transmitting caller data, in response to the issuing step, via the kernel-mode data transmission procedure.

26. The method of claim 25 wherein the step of transmitting caller data comprises the step of sending head data via the kernel-mode data transmission procedure.

27. The method of claim 25 wherein the step of transmitting caller data comprises the step of sending tail data via the kernel-mode data transmission procedure.

28. The method of claim 19 further comprising the steps of:
transmitting head data, in response to the issuing step, via the kernel-mode data transmission procedure; and
transmitting tail data, in response to the issuing step, via the kernel-mode data transmission procedure.

29. The method of claim 19 wherein the kernel-mode data transmission procedure incorporates a transport layer protocol.

30. The method of claim 29 wherein the kernel-mode data transmission procedure incorporates a TCP/IP transport protocol.

31. The method of claim 29 wherein the kernel-mode data transmission procedure incorporates an IPX/SPX transport protocol.

32. The method of claim 19 wherein the kernel-mode accessed memory comprises cache memory administered by a file system cache.

33. The method of claim 19 wherein the secondary data storage device is a hard disk.

34. The method of claim 19 wherein the secondary data storage device is a CD ROM.

35. A method for transmitting, by means of a series of send operations performed by a kernel-mode transmission procedure, data from a file stored on a secondary data storage device on a first networked machine having a kernel-mode accessed memory to a second networked machine, said method comprising the steps of:
issuing, using a single call by a user-mode process within the first networked machine to a kernel-mode process, a transmit request including an identifier of a segment of data; and
performing, by kernel-mode processes, in response to the issuing step, a transmission of the segment of data comprising a plurality of data blocks to the second networked machine, said performing step comprising repeating a plurality of times the steps of:
identifying a designated data block of the plurality of data blocks;
copying the designated data block from the secondary data storage device to the kernel-mode accessed memory; and
transmitting, by the kernel-mode data transmission procedure, the designated data block from the kernel-mode accessed memory to the second networked machine.

36. The method of claim 35 further comprising the steps of:
determining, by a kernel-mode process, that a remaining portion of the plurality of data blocks has not been transmitted, and in response thereto updating a pointer identifying a next data block of the segment of data to be transmitted in accordance with said identifying, copying and transmitting steps.

37. A file server for receiving a request for transmitting data from a file stored upon a secondary data storage device from a second networked machine, and in response transmitting the data from the file to the second networked machine, the file server comprising:
a kernel-mode accessed memory;
a user-mode process for issuing a transmit request using a single call to a kernel-mode process, the transmit request including a non-address file identification corresponding to the file;
a kernel-mode file system data controller for copying, in response to the transmit request, a data block within the file from the secondary data storage device to the kernel-mode accessed memory; and
a kernel-mode data transmission controller for transmitting, in response to the transmit request and the kernel-mode file system data controller copying the data block to the kernel-mode accessed memory, the data block from the kernel-mode accessed memory to the second networked machine on the established connection.

38. The file server of claim 37 wherein the non-address file identification is a file handle.

39. The file server of claim 37 wherein the non-address file identification is a file name.

40. The file server of claim 37 wherein the data block is transmitted from the file server to the second networked machine via an established connection between the file server and the second networked machine, and wherein the file server further comprises:
means for providing, by the user-mode process to a kernel-mode process, a network connection identifier corresponding to the established connection between the file server and the second networked machine.

41. The file server of claim 40 wherein the network connection identifier is a socket handle.

42. The file server of claim 37 wherein the data block is stored in a buffer within the kernel-mode accessed memory, and the file server further comprises:
means for providing to the kernel-mode data transmission controller an identifier corresponding to the buffer within the kernel-mode accessed memory.

43. The file server of claim 42 wherein the identifier comprises a pointer to the buffer within the kernel-mode accessed memory.

44. The file server of claim 37 further comprising:
means for transmitting caller data, in response to the transmit request, via the kernel-mode data transmission controller.

45. The file server of claim 44 wherein the means for transmitting caller data comprises means for transmitting head data.

46. The file server of claim 45 wherein the means for transmitting caller data comprises means for transmitting tail data.

47. The file server of claim 44 wherein the means for transmitting caller data comprises means for transmitting tail data.

48. The file server of claim 37 wherein the kernel-mode data transmission controller incorporates a transport layer protocol.

49. The file server of claim 48 wherein the kernel-mode data transmission controller incorporates a TCP/IP transport protocol.

50. The file server of claim 48 wherein the kernel-mode data transmission controller incorporates an IPX/SPX transport protocol.

51. The file server of claim 37 wherein the kernel-mode accessed memory comprises cache memory administered by a file system cache.

52. The file server of claim 37 wherein the secondary data storage device is a hard disk.

53. The file server of claim 37 wherein the secondary data storage device is a CD ROM.

54. A file server for transmitting, by means of a series of send operations performed by a kernel-mode transmission procedure, data from a file stored on a secondary data storage device on the file server to a second networked machine, said file server comprising:
- a kernel-mode accessed memory;
- a user-mode process for issuing a transmit request using a single call to a kernel-mode process, the transmit request including an identifier of a segment of data;
- a kernel-mode file system data controller for copying, in response to the transmit request, the segment of data comprising a plurality of data blocks, from the secondary data storage device to the kernel-mode accessed memory; and
- means for repeating a plurality of times, by kernel-mode processes, in response to the transmit request:
  - identifying a designated data block of the plurality of data blocks; and
  - transmitting, by the kernel-mode data transmission procedure, the designated data block to the second networked machine.

55. The file server of claim 54 further comprising:
kernel-mode processing means for determining that a remaining portion of the plurality of data blocks has not been transmitted, and in response thereto updating a pointer identifying a next data block of the segment of data to be transmitted in accordance with said identifying and transmitting steps.

56. The file server of claim 54 wherein the data block is transmitted from the file server to the second networked machine via an established connection between the file server and the second networked machine, and wherein the file server further comprises:
means for providing, by the user-mode process to a kernel-mode process, a network connection identifier corresponding to the established connection between the file server and the second networked machine.

57. The file server of claim 56 wherein the network connection identifier is a socket handle.

58. The file server of claim 54 wherein the data block is stored in a buffer within the kernel-mode accessed memory, and the file server further comprises:
means for providing to the kernel-mode data transmission controller an identifier corresponding to the buffer within the kernel-mode accessed memory.

59. The file server of claim 58 wherein the identifier comprises a pointer to the buffer within the kernel-mode accessed memory.

60. The file server of claim 54 further comprising:
means for transmitting caller data, in response to the transmit request, via the kernel-mode data transmission controller.

61. The file server of claim 60 wherein the means for transmitting caller data comprises means for transmitting head data.

62. The file server of claim 61 wherein the means for transmitting caller data comprises means for transmitting tail data.

63. The file server of claim 60 wherein the means for transmitting caller data comprises means for transmitting tail data.

64. The file server of claim 54 wherein the kernel-mode data transmission procedure incorporates a transport layer protocol.

65. The file server of claim 64 wherein the kernel-mode data transmission procedure incorporates a TCP/IP transport protocol.

66. The file server of claim 64 wherein the kernel-mode data transmission procedure incorporates an IPX/SPX transport protocol.

67. The file server of claim 54 wherein the kernel-mode accessed memory comprises cache memory administered by a file system cache.

68. The file server of claim 54 wherein the secondary data storage device is a hard disk.

69. The file server of claim 54 wherein the secondary data storage device is a CD ROM.

70. A file server for transmitting, by means of a series of send operations performed by a kernel-mode transmission procedure, data from a file stored on a secondary data storage device on the file server to a second networked machine, the file server comprising:
- a kernel-mode accessed memory;
- a user-mode process for issuing a transmit request using a single call to a kernel-mode process, the transmit request including an identifier of a segment of data; and
- means for performing, by kernel-mode processes, in response to the transmit request, a transmission of the segment of data comprising a plurality of data blocks to the second networked machine, said means for performing step comprising means for repeating a plurality of times:
  - identifying a designated data block of the plurality of data blocks;
  - copying the designated data block from the secondary data storage device to the kernel-mode accessed memory; and
  - transmitting, by the kernel-mode data transmission procedure, the designated data block from the kernel-mode accessed memory to the second networked machine.

71. The file server of claim 70 further comprising:
kernel-mode processing means for determining that a remaining portion of the plurality of data blocks has not been transmitted, and in response thereto updating a pointer identifying a next data block of the segment of data to be transmitted in accordance with said identifying, copying and transmitting steps.

72. A network for facilitating the transmission of a file stored on a secondary data storage device to other networked machines, the network comprising:
- a second networked machine comprising means for requesting the file stored on the secondary data storage device;
- a first networked machine including the secondary data storage device and further comprising:
  - a kernel-mode accessed memory;
  - a user-mode process for issuing a transmit request using a single call to a kernel-mode process, the transmit request including an identifier of a segment of data;

a kernel-mode file system data controller for copying, in response to the transmit request, the segment of data comprising a plurality of data blocks, from the secondary data storage device to the kernel-mode accessed memory; and means for repeating a plurality of times, by kernel-mode processes, in response to the transmit request:
identifying a designated data block of the plurality of data blocks; and
transmitting, by a kernel-mode data transmission procedure, the designated data block to the second networked machine; and
a network link communicatively coupling the second networked machine and the first networked machine.

73. The network of claim 72 wherein the network link is a LAN link.

74. The network of claim 72 wherein the network link is a WAN link.

75. The network of claim 72 wherein the first networked machine further comprises:
means for transmitting caller data, in response to the transmit request, via the kernel-mode data transmission controller.

76. The network of claim 75 wherein the means for transmitting caller data comprises means for transmitting head data.

77. The file server of claim 76 wherein the means for transmitting caller data comprises means for transmitting tail data.

78. The file server of claim 75 wherein the means for transmitting caller data comprises means for transmitting tail data.

* * * * *